3,125,663
HEATED PET BED
Roy D. Hoffman, 325 S. Richard St., Bedford, Pa.
Filed Dec. 23, 1960, Ser. No. 77,946
3 Claims. (Cl. 219—46)

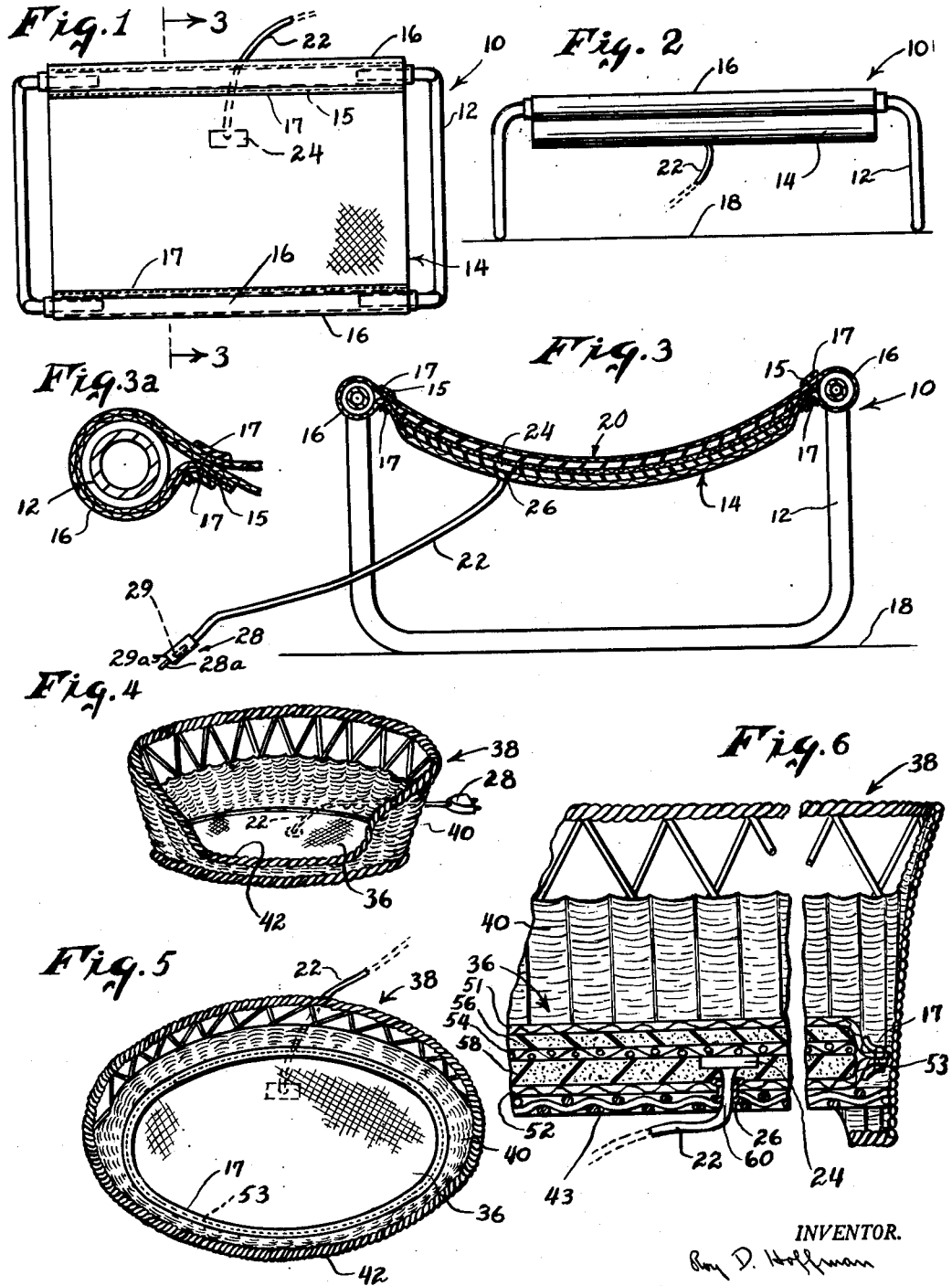

This invention relates to heated beds intended especially for pets. Some features of the invention are useful also in bassinets for babies.

It is an object of the invention to provide a bed containing a pad to which heat is supplied through a connection in the bottom of the pad and at a location which is inaccessible to a pet lying on the pad. This invention makes it practical to use electrically heated pads for pet beds, because the wires are at a location where they cannot be chewed or clawed or otherwise damaged by the pet. This eliminates a fire hazard and also protects the pet from possible injury by electricity at regions of damaged insulation.

The invention is applicable to different types of pet beds such as the hammock type, as well as the basket beds. One outstanding advantage of the invention is that it makes the beds much more appealing to the pet and owners experience less difficulty training pets to use the beds.

Another object of the invention is to provide a pet bed with a heated pad which is of rugged construction and insulated by foam material which serves to provide both heat insulation and padding within the pad. Most of the foam is under the heat element so that the larger part of the heat escapes upwardly.

Other objects, features and advantages of the invention will appear or be pointed out as the description proceeds.

In the drawing, forming a part hereof, in which like reference characters indicate corresponding parts in all the views:

FIGURE 1 is a top plan view of a hammock-type pet bed made in accordance with this invention;

FIGURE 2 is a front view of the pet bed shown in FIGURE 1;

FIGURE 3 is an enlarged sectional view taken on the line 3—3 of FIGURE 1;

FIGURE 3a is an enlarged detail view of the seam along one edge region of the pet bed shown in FIGURES 1–3.

FIGURE 4 is a vertical sectional view through a modified form of the invention in which the bed is of the basket or bassinet type;

FIGURE 5 is a top plan view of the pet bed shown in FIGURE 4; and

FIGURE 6 is a greatly enlarged sectional view through a portion of the pad used in the pet beds of the other figures and showing the relation of the power connection to the bottom of the bed.

FIGURE 1 shows a pet bed 10 having a tubular frame 12 by which a hammock portion 14 is supported. This hammock portion is preferably made of waterproof nylon mesh material or other plastic, and the top and bottom portions are sutured together by suture 15 along seams 16 at opposite edges of the bed. The seams provide tubular edge regions through which the longitudinal portion of the tubular frame 12 extends for supporting the hammock portion some distance above a floor or other support 18 on which the bed rests.

There is a layer of plastic 17 covering both the top and bottom of each of the seams 16 and this plastic is bonded to the nylon mesh, preferably by heat sealing the plastic to the nylon. The sutures are thus sealed in the plastic.

The hammock portion 14 is heated by an electric heating pad structure 20 which extends across most of the area of the hammock portion. In the preferred construction, the hammock portion is of two thicknesses and formed from a flattened tube of sheet material with the upper and lower superimposed layers of the material forming the top and bottom covering of the heating pad. The seams of the hammock portion, through which the tubes of the bed frame extend, are correlated with the spacing of the tube so as to give a moderate sag to the hammock and preferably to put at least a substantial part of the weight of the pet on the bottom layer of the material of which the hammock portion is made. This makes the padding between the layers effective to provide a soft bed.

Some features of the invention can be used with a complete heating pad interposed between the top and bottom layers or thicknesses of the hammock portion of the bed, but the use of the material of the hammock portion as the top and bottom covering for the heating pad provides a more efficient and economical construction. The inside structure of the heating pad 20 will be described in connection with FIGURE 6.

For the present, it is sufficient to understand that the heating pad structure includes an electrically heated element to which power is supplied through a drop cord conductor 22. The conductor 22 connects with the pad structure at a terminal region 24 located under the hammock portion and preferably at a substantial distance inward from any edge of the bed. In the preferred construction, the terminal region is near the center of the bottom surface of the hammock portion.

There is an opening 26 through the bottom of the hammock portion 14. The drop cord conductor 22 extends through this opening 26 but the sides of the opening 26 prevent displacement of the conductor from its intermediate position between the sides of the bed. A fitting 28 at one end of the conductor 22 has conventional prongs 28a for insertion into an electric outlet. The fitting 28 contains a circuit breaker 29 which is reset by a handle 29a extending from one end of the fitting 28.

The drop cord conductor 22 comes out through the bottom of the hammock portion with a strong connection between the conductor 22 and the heating pad structure so that the connection serves, in effect, as a key for preventing shifting of the heating pad structure in the hammock portion of the bed shown in FIGURES 1–3; and in the basket bed shown in the other figures of the drawing.

The conductor 22 extends toward the rearward portion of the bed and under the rearward longitudinal tube of the frame 12. When the bed is located in position in a room, this rearward portion of the frame is placed close to a wall or other structure and preferably near the outlet from which the conductor 22 receives its power. Under such circumstances no part of the conductor 22 is ever exposed to view from above; but even where the bed is at some distance from an electrical outlet, the portion of the conductor 22 extending along the wall does not attract the attention of a pet. On the other hand, heating pad connections coming out of the edge of a pad, as in the conventional heating pad, do attract the attention of pets, and especially puppies, lying on the pad, with the result that the conductors are frequently chewed and the insulation irreparably damaged.

FIGURE 4 shows a heating pad 36, which may be identical to the pad 20 except for shape and edge construction. The pad 36 is located in a pet bed 38 which is of the bassinet type, having a side wall 40 and an open front entrance 42 through which the pet has convenient access to the bed.

The pad 36 is preferably made with the same shape as the interior of the bed 38 and of a size to fit the bassinet so that the side wall 40 holds, or assists in holding, the pad 36 against lateral displacement on the bottom of the basket 38. This bottom is designated by the reference character 43 in FIGURES 4 and 6; and the bottom is supported above the floor, on which the basket rests, by the lower portions of the side wall 20 which extend below the bottom 43.

As in the construction shown in FIGURES 1-3, the pad 36 has a conductor 22 extending downwardly through an opening 26 in the bottom of the bed 38. This conductor 22 and its connection to the pad 36 may be used to prevent displacement of the pad 36, particularly where the pad is somewhat smaller than the interior of the bed 38.

FIGURE 6 shows the construction of the pad 36, and it will be understood that this same internal construction is preferably used for the pad 20. The pad includes an envelope or outer casing having a top panel 51 and a bottom panel 52. These panels are preferably of waterproof plastic material and the envelope may be of one-piece construction with the top and bottom panels bonded to one another around the edges of the panels. In the illustrated construction the top panel 51 and the bottom panel 52 are connected together along their edges by a line of nylon sutures 53.

The pad contains an electric heating element 54. This may be of similar construction to conventional heating pads with conductor resistor elements extending back and forth across a backing sheet. On top of the heating element 54 there is an upper layer of foam 56; and beneath the heating element 54 there is a lower layer 58 of plastic foam. This foam provides the padding for the pad 20 and also provides thermal insulation for controlling the escape of heat from the heating element 54. The lower or bottom layer 58 is preferably twice as thick as the upper layer 56 so that much less heat flows downwardly from the pad. This makes the operation of the pad more economical in that most of the heat is supplied to the top of the pad where it is needed.

The panels 51 and 52 are preferably made of flexible but hard material which a pet will not chew; for example, nylon mesh. In the preferred construction, there is a layer of plastic, such as polyvinyl chloride or polyethylene terephthalate, bonded to each of the panels 51 and 52 and covering the sutures so that they are enclosed in the plastic where they emerge from the panels.

FIGURE 6 also shows the way in which the conductor 22 is connected with the pad 20 by a templet 60 at the terminal region 24, and shows the way in which the connection of the conductor 22 to the pad is related with the opening 26 in the bottom of the bed 10.

The preferred embodiments of the invention have been illustrated and described, but changes and modifications can be made and some features can be used in different combinations without departing from the invention as defined in the claims.

What is claimed is:

1. A pet bed including a bottom, a heating pad having peripheral edges and extending across the bottom and on which a pet lies, the heating pad having electric resistance units therein supplied with current from a power source, the bottom of the bed having an opening thereto at a location spaced inward from all of the peripheral edges of the heating pad, a conductor from the heating pad and entering the heating pad and connecting therewith at a region spaced inward from said peripheral edges, the conductor extending through the opening and being held against transverse displacement by sides of said opening and extending under said bottom whereby the conductor is inaccessible to a pet lying on the bed, and in which the bed is a basket having a wall that extends along both ends of the bed and across the back thereof, but with an interruption in the front of the wall for a pet to enter the basket, at least part of the wall extending below the bottom of the basket and holding part of the basket spaced above a support on which the basket rests, and the heating pad rests on a top surface of the bottom of the basket, and the conductor extends through the bottom of the basket and then rearwardly under a part of the bottom that is spaced above the support and then beyond the basket at the back thereof and behind said wall.

2. A pet bed comprising a basket having a bottom and a wall that extends along both ends of the bed and across the back thereof, but with an interruption in the front of the wall for a pet to enter the basket at least part of the wall extending below the bottom of the basket and holding part of the basket spaced above a support on which the basket rests, a heating pad that rests on a top surface of the bottom of the basket, electric heating elements in the pad, and a power-supply cable extending from the heating elements and through the bottom of the basket and under a part of the bottom that is spaced above the support and then away from the basket behind the wall and at a location inaccessible to a pet using the bed.

3. The pet bed described in claim 2 and in which the heating pad is covered with a flexible but hard plastic providing a surface which a pet does not chew, and means for holding the pad against displacement.

References Cited in the file of this patent

UNITED STATES PATENTS

| 1,760,301 | Dougherty | May 27, 1930 |
| 1,820,602 | Dick | Aug. 25, 1931 |
| 1,839,580 | Myron | Jan. 5, 1932 |
| 1,851,499 | Edwards | Mar. 29, 1932 |
| 2,153,078 | Deuches | Apr. 4, 1939 |
| 2,162,021 | Kidwell | June 13, 1939 |
| 2,185,692 | McCleary | Jan. 2, 1940 |
| 2,376,902 | Clark | May 29, 1945 |
| 2,401,605 | Boren | June 4, 1946 |
| 2,477,387 | Mestitz | July 26, 1949 |
| 2,621,279 | Richardson | Dec. 9, 1952 |
| 2,649,533 | Meredith | Aug. 18, 1953 |
| 2,666,839 | Boetel | Jan. 19, 1954 |
| 2,850,617 | Coldren | Sept. 2, 1958 |
| 2,873,352 | Franco | Feb. 10, 1959 |
| 2,948,802 | Shaw | Aug. 9, 1960 |

FOREIGN PATENTS

| 141,562 | Sweden | Aug. 4, 1953 |
| 213,157 | Australia | Jan. 15, 1958 |
| 791,409 | France | Sept. 30, 1935 |
| 1,156,503 | France | Dec. 16, 1957 |